United States Patent
Baffie et al.

(10) Patent No.: US 9,755,260 B2
(45) Date of Patent: Sep. 5, 2017

(54) METHOD FOR MANUFACTURING A HIGH-TEMPERATURE ELECTROLYSER OR A HIGH-TEMPERATURE FUEL CELL COMPRISING A STACK OF ELEMENTARY CELLS

(75) Inventors: Thierry Baffie, Saint-Egreve (FR); Julien Cigna, Sassenage (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 859 days.

(21) Appl. No.: 13/143,539

(22) PCT Filed: Jan. 6, 2010

(86) PCT No.: PCT/EP2010/050082
§ 371 (c)(1),
(2), (4) Date: Sep. 29, 2011

(87) PCT Pub. No.: WO2010/079184
PCT Pub. Date: Jul. 15, 2010

(65) Prior Publication Data
US 2012/0018493 A1   Jan. 26, 2012

(30) Foreign Application Priority Data
Jan. 7, 2009 (FR) .................................. 09 50071

(51) Int. Cl.
*C25D 17/00* (2006.01)
*C25B 9/10* (2006.01)
(Continued)

(52) U.S. Cl.
CPC ............ *H01M 8/1213* (2013.01); *C25B 9/10* (2013.01); *C25B 9/18* (2013.01); *H01M 8/02* (2013.01);
(Continued)

(58) Field of Classification Search
CPC .............................. C25D 17/00; C25D 17/004
(Continued)

(56) References Cited

U.S. PATENT DOCUMENTS 3,224,071 A * 12/1965 Levi et al. .................... 228/199
4,255,247 A *  3/1981 Oda et al. .................... 204/293
(Continued)

FOREIGN PATENT DOCUMENTS

DE   10 2005 009307     9/2006
JP   2002-544383 A     12/2002
(Continued)

OTHER PUBLICATIONS

International Search Report dated Mar. 29, 2010 for PCT Application No. PCT/EP2010/050082.
(Continued)

*Primary Examiner* — Zulmariam Mendez
(74) *Attorney, Agent, or Firm* — Knobbe Martens Olson & Bear LLP

(57) ABSTRACT

A method for manufacturing a high temperature electrolyzer (HTE) or a high temperature fuel cell is disclosed. According to one aspect, the HTE includes a vertical stack of n elementary planar cells alternating with n+1 interconnection plates. Each of the elementary cells include a planar porous anode and a planar porous cathode each having cutouts formed therein. The anode and cathode are respectively positioned on each of the faces of a planar dense electrolyte. Brazed joints are formed by infiltration of a defined amount of a brazing composition in the electrodes at contact points between the elementary cells and the interconnection plates.

24 Claims, 9 Drawing Sheets

(51) Int. Cl.
   *C25B 9/18* (2006.01)
   *H01M 8/02* (2016.01)
   *H01M 8/24* (2016.01)
   *H01M 8/1213* (2016.01)
   *H01M 8/1246* (2016.01)
   *H01M 4/86* (2006.01)
   *H01M 8/124* (2016.01)

(52) U.S. Cl.
   CPC ........... *H01M 8/1246* (2013.01); *H01M 8/24* (2013.01); *H01M 4/8605* (2013.01); *H01M 2008/1293* (2013.01); *Y02E 60/366* (2013.01); *Y02E 60/525* (2013.01); *Y02P 70/56* (2015.11)

(58) Field of Classification Search
   USPC .................................. 204/242, 253; 429/465
   See application file for complete search history.

(56) References Cited

U.S. PATENT DOCUMENTS

| | | | |
|---|---|---|---|
| 4,675,094 A * | 6/1987 | Kaminaga et al. ...... | 204/290.11 |
| 4,744,879 A * | 5/1988 | Kaminaga et al. ...... | 204/290.11 |
| 5,496,655 A * | 3/1996 | Lessing ...................... | 429/425 |
| 5,629,103 A | 5/1997 | Wersing | |
| 6,080,503 A * | 6/2000 | Schmid ..................... | C25B 9/10 |
| | | | 429/483 |
| 6,277,510 B1 * | 8/2001 | Chang et al. ............... | 204/293 |
| 6,355,356 B1 | 3/2002 | Hasz | |
| 6,490,146 B2 | 12/2002 | Wang et al. | |
| 8,293,143 B2 * | 10/2012 | Chartier et al. ........... | 252/519.2 |
| 2007/0141435 A1 | 6/2007 | Hasz | |
| 2008/0182152 A1 * | 7/2008 | Erikstrup ................... | 429/34 |
| 2009/0098436 A1 * | 4/2009 | Yamada et al. ............. | 429/33 |
| 2010/0279207 A1 * | 11/2010 | Kearl et al. .................. | 429/514 |

FOREIGN PATENT DOCUMENTS

| | | |
|---|---|---|
| JP | 2006-032192 A | 2/2006 |
| JP | 2006-079889 | 3/2006 |
| JP | 2007-087868 | 4/2007 |
| JP | 2007-287685 A | 11/2007 |
| JP | 2008-525967 A | 7/2008 |
| WO | WO 91/13462 | 9/1991 |
| WO | WO 00/68463 | 11/2000 |
| WO | WO 2006/086037 A1 | 8/2006 |
| WO | WO 2006/127045 A2 | 11/2006 |
| WO | WO 2007/044045 | 4/2007 |
| WO | WO 2007/062117 A2 | 5/2007 |

OTHER PUBLICATIONS

French search report for French Application No. 09 50071, dated Aug. 5, 2009, in 1 page.

Japanese Office Action dated Jul. 1, 2014 for Japanese Application No. 2011-544857 which corresponds in priority to above-identified subject U.S. application.

* cited by examiner

5 Cell { 2 - Cathode 30-50μm
3 - Electrolyte 80-200μm
1 - Anode 30-50μm }

METHOD FOR MANUFACTURING A HIGH-TEMPERATURE ELECTROLYSER OR A HIGH-TEMPERATURE FUEL CELL COMPRISING A STACK OF ELEMENTARY CELLS

TECHNICAL FIELD

The invention relates to a method for manufacturing a high temperature electrolyzer (HTE) or a high temperature fuel cell (Solid Oxide Fuel Cell) (SOFC)) comprising a stack of elementary cells.

The technical field of the invention may thus be generally defined as that of high temperature electrolyzers and of high temperature fuel cells and more specifically as that of high temperature electrolyzers and high temperature fuel cells comprising a stack of elementary cells.

BACKGROUND ART

In high temperature electrolyzers, electrolysis of water at a high temperature is achieved from vaporized water. The function of a high temperature electrolyzer is to transform the steam into hydrogen and oxygen according to the following reaction: $2H_2O_{(g)} \rightarrow 2H_2 + O_2$.

This reaction is carried out via an electrochemical route in the cells of the electrolyzer.

Each elementary cell is, as this is seen in FIG. 1, made up with two electrodes, i.e. an anode (1) and a cathode (2), sandwiching a solid electrolyte generally in the form of a membrane (3).

Both electrodes (1, 2) are electron conductors and the electrolyte (3) is an ion conductor.

The electrochemical reactions occur at the interface between each of the electron conductors and the ion conductor.

At the cathode (2), the half reaction is the following: $2H_2O + 4\ e^- \rightarrow 2H_2 + 2O^{2-}$;

And at the anode (1), the half reaction is the following: $2O^{2-} \rightarrow O_2 + 4e^-$.

The electrolyte (3) placed between both electrodes is the migration site of the $O^{2-}$ ions (4), under the effect of the electric field generated by the potential difference imposed between the anode (1) and the cathode (2).

An elementary reactor illustrated in FIG. 2, consists of an elementary cell (5) as described above, with an anode (1), an electrolyte (3), and a cathode (2) and two monopolar connectors or more exactly two half-interconnectors (6, 7) which ensure electric, hydraulic and thermal functions. This elementary reactor is called a module.

In order to increase the produced hydrogen and oxygen flow rates, as this is shown in FIG. 3, several elementary modules are stacked (8), the cells (5) then being separated by interconnectors or bipolar interconnection plates (9).

The assembly of the modules (8) is positioned between two upper (10) and lower (11) interconnection plates which bear electric power supplies and gas supplies (12). One then refers to this as a stack (FIG. 3).

There exist two concepts, configurations, architectures for the "stack":
  tubular stacks, in which the cells are tubes, and
  planar stacks, in which the cells are made as plates like in FIG. 3.

In the planar architecture, the cells and the interconnectors are in contact in many points. The manufacturing of the stack is subject to fine tolerances as to the flatness of the cells in order to avoid too high contact pressures or an inhomogeneous distribution of the stresses, which may lead to cracking of the cells.

The sealing joints (gaskets) in a stack have the goals of preventing a hydrogen leak from the cathode towards the neighboring anodes, preventing an oxygen leak from the anode towards the neighboring cathodes, preventing a hydrogen leak towards the outside of the stack and finally limiting the leaks of steam from the cathodes to the anodes.

Within the scope of the development of a stack for high temperature electrolysis ("HTE"), and as is shown in FIG. 4, gas-tight joints (gaskets) (13) are thus made between the planar electrolysis cells (5), each consisting of an anode/electrolyte/cathode ceramic trilayer, and the interconnectors or metal interconnection plates (9).

It should be noted that the dimensions given in µm in FIG. 4 are only given as examples.

More specifically, a joint (gasket) is made between the lower surface of each cell (5) and the upper half-interconnector (14) of the interconnection plate located below the cell on the one hand, and between the upper surface of each cell and the lower half-interconnector (15) of the interconnection plate located above the cell (5) on the other hand.

These joints (gaskets) (13) should generally have a leak flow rate in air below $10^{-3}$ NmL/min/mm between 700° C. and 900° C. under a pressure difference, gap, from 20 to 500 mbars.

In addition to this sealing function, the joint (gasket) may in certain cases have secondary assembling and electric conduction functions. For certain stack architectures, a ceramic part, called a cell support, may be placed between the cells and the interconnectors; and gas-tight joints (gaskets) are then also required with this cell supporting part.

Several sealing solutions are presently being studied, i.e.: cements or ceramic adhesives, glass joints (gaskets) or glass ceramic joints (gaskets), compressed metal joints (gaskets), compressed mica joints (gaskets), brazed joints (gaskets) and mixed solutions requiring several of these techniques.

These joints (gaskets) should make it possible to ensure the seals between the cathodic chamber and the outside, between the anodic chamber and the outside, and between both chambers, and thereby avoid gas leaks between both chambers and towards the outside.

The seals by brazing are generally achieved between dense materials which are the electrolyte (3), for example in yttriated zirconia on the one hand and the interconnectors (9, 14, 15) or the cell supports on the other hand.

In the case of high temperature fuel cells (SOFC) in which the support is formed by the electrolyte and which are thereby called "electrolyte supported cells" ("ESC"), the electrodes are of smaller dimensions than the electrolyte so that the brazed gaskets made at the periphery are not in contact with the electrodes.

Also, industrially, for Anode-Supported Cells ("ASC"), the dimensions of the cathode are themselves reduced in order to be able to braze the interconnector onto the electrolyte, since the interconnector and the electrolyte are both formed by dense materials. Therefore there then exists a certain drawback related to the surface area loss of the electrodes.

Indeed, the electrodes, the anode and the cathode, are porous materials, having generally a porosity of the order of 30-50% by volume and brazing of such porous materials has many difficulties and many drawbacks.

Although certain patent applications, for example applications WO-A1-2006/086037; WO-A2-2006/127045; WO-A2-2007/062117 mention the possibility of brazing porous electrodes, no demonstration of the feasibility of such a method without degrading the electrodes is made at the scale of the grain.

More specifically, if an attempt is made to achieve a brazed gasket between these porous electrodes and the interconnectors in order to ensure a tightness in the direction of the thickness of the electrodes, the brazing alloy infiltrates by a capillary effect the pores over very large distances, which may laterally attain, reach, for example several mm, which reduces their electrochemically active surface area and thus reduces their yield.

By reducing the brazing temperature in order to make the alloy viscous, it is possible to manage control of this infiltration in the electrodes.

But, for a stack, this requires perfect homogeneity of the temperature over the whole of the stack, which industrially is very difficult to control.

Today, the thickness of the porous electrodes is defined to within ±10 μm by the suppliers and the rated nominal dimension may change over time or be modified.

In front of these risks, and despite the problems mentioned above, the choice was therefore made to make the interconnector/cell seals on the porous electrodes. With this orientation, it is possible to notably simplify the geometrical specification of the cells.

However, in order to properly control the chain of dimensions of a electrolysis stack and thus maintain all the electric contacts between the interconnectors and the electrodes, a limited overthickness or even no overthickness has to be generated by the brazed gaskets at the interconnector/cell interface.

If an overthickness is inevitable, it requires either perfect control of a constant thickness of the brazed joints for each cell, or the addition of thickness shims, also called spacers, or further machining or Stamping of the interconnectors with extreme accuracies on their geometrical tolerances.

The first solution is not at all under control, while the second and third solutions complicate the manufacturing method and should be avoided.

Considering the foregoing, there therefore exists a need for a method for manufacturing a high temperature electrolyzer or a high temperature fuel cell comprising a vertical stack of elementary planar cells separated by interconnection plates, gas-tight brazed gaskets achieving the assembling of the cells and of the interconnection plates, in which said gaskets are made between the interconnectors and the porous electrodes, and in which the infiltration of the brazing composition into the porous electrodes is perfectly under control, in all the directions, and notably laterally, so as to ensure a mechanically solid assembly of the whole "stack" and not to reduce the electrochemically active surface area of the electrodes.

There still exists a need for such a method which allows perfect control in a simple and reliable way, of the chain of dimensions (tolerance stack-up) of the stack, such as its total thickness, in order to thereby maintain all the electric contacts between the interconnection plates and the electrodes.

In particular, there exists a need for a method with which stacks may be made in which the brazed gaskets have no overthickness, in other words in which the upper or lower portion of these gaskets remains in the plane of the electrodes which is also the one of the interconnection plate (or of the ceramic support) to be assembled.

There also exists a need for such a method which is simple, reliable, only includes a limited number of steps and which avoids resorting to complex steps, difficult to control or costly.

The goal of the present invention is to provide a method for manufacturing a high temperature electrolyzer comprising a vertical stack of n elementary planar cells alternating with n+1 interconnection plates, each of the elementary cells being composed of (consisting in) a planar porous anode and a planar porous cathode respectively positioned on each of the faces of a planar dense electrolyte, and gaskets being provided at contact points between the elementary cells and the interconnection plates, which meets the needs listed above.

The goal of the present invention further is to provide such a method which does not have the drawbacks, limitations, defects and disadvantages of the compositions of the prior art and which solve the problems of the methods of the prior art.

DESCRIPTION OF CERTAIN INVENTIVE ASPECTS

This goal and further other ones are achieved according to the invention by a method for manufacturing a high temperature electrolyzer ("HTE") or a fuel cell ("SOFC") comprising a vertical stack of n elementary planar cells alternating with n+1 interconnection plates, each of the elementary cells consisting in a planar porous anode and a planar porous cathode respectively positioned on each of the faces of a dense planar electrolyte, and brazed gaskets being provided at contact points between the elementary cells and the interconnection plates, a method in which the following successive steps are performed:

a) an openworked (having cut-outs) anode and an openworked (having cut-outs) cathode are respectively prepared on each of the faces of the electrolyte, so as to leave first surface areas of each of the faces of the electrolyte corresponding to the holes (openworks, cut-outs) non-covered by the anode or the cathode, these first non-covered areas delimiting second surface area(s) of each of the faces of the electrolyte covered by the anode or the cathode at the intended locations for the brazed gaskets, whereby an elementary cell is obtained comprising an openworked anode and an openworked cathode, each with a thickness;

b) A brazing composition layer is deposited on the surfaces of the anode and of the cathode corresponding to the second areas, the amount of brazing composition being such that in the molten state, it fills all the porosity in the thickness of the anode or of the cathode as far as the surface of the electrolyte in the second areas, without jutting out beyond the surface of the anode or of the cathode by a thickness of more than 20% of the thickness of the anode or of the cathode, whereby an elementary cell is obtained, provided with a brazing composition;

c) steps a) and b) are repeated n times;

d) an interconnection plate followed by a cell are successively stacked vertically;

e) step d) is repeated n times, and then a last or n+1$^{th}$ interconnection plate is stacked;

f) the stack formed by the elementary cells provided with the brazing composition and the interconnection plates is heated to a sufficient brazing temperature in order to melt the brazing composition, whereby the brazing composition fills the whole porosity in the thickness of the anode or of the cathode from their surface as far as the surface of the electrolyte in the second areas, without jutting out beyond the surface of the anode or of the cathode by a thickness of more than 20% of the thickness of the anode or of the cathode;

g) The stack is cooled from the brazing temperature down to room temperature, whereby (in return for which) the electrolytes and the interconnectors are assembled by the brazed gaskets.

Advantageously, in step b) the amount of brazing composition is such that, in the molten state, it does not jut out beyond the surface of the anode or of the cathode; and in step f), the brazing composition does not jut out beyond the surface of the anode or of the cathode.

Generally, prior to step d), a lower terminal plate of the stack is set into place on a support, and following step e), an upper terminal plate of the stack is set into place.

According to a first embodiment for preparing the openworked electrodes, the openworked anode and the openworked cathode may be prepared by selectively depositing a layer of a suspension (slurry) of an anode, respectively cathode material, for example by screen-printing by means of a mask, only on said second areas of each of the faces of the electrolyte and then by sintering said layers.

Thus, advantageously, a layer of a suspension (slurry) of a cathode material may be deposited on a face, preferably the upper face of the electrolyte, and said layer may be sintered, and then a layer of a suspension (slurry) of an anode material may be deposited on the other face, preferably the lower face of the electrolyte, and said layer is sintered.

According to a second embodiment of the openworked electrodes, the openworked anode and the openworked cathode may be prepared by preparing a non-openworked complete anode and a non-openworked cathode for example by screen-printing and then by sintering, and then generating the holes (openworks) by removing material, for example by laser ablation or machining.

Advantageously, the electrolyte, the anode, and the cathode may be discs, preferably with a common central axis, preferably of same diameter, and two concentric rings may form the first areas on either side of a third ring forming the first area.

Advantageously, the brazing composition may be deposited on the second areas by screen-printing by means of a mask, or else manually or with a robot by means of a syringe and a pneumatic dispenser.

Advantageously, the electrolyte has a thickness from 5 to 200 µm, preferably from 50 to 150 µm, still preferably 90 µm.

Generally, the electrolyte is made of a dense material which may have a porosity of less than 10% by volume.

Advantageously, the electrolyte may be a material selected from doped oxide ceramics such as yttriated zirconia, scandiated zirconia and strontiated lanthanum manganite doped with cerium.

Advantageously, the anode and the cathode may have a thickness from 10 to 70 µm, preferably 40 µm.

Advantageously, the anode and the cathode may be made of a porous material having a porosity, for example from 30 to 50% by volume.

Advantageously, the anode and the cathode may be independently of each other made of a material selected from gadoliniated cerium nickel oxide cermet (NiO—CGO), strontiated lanthanum manganite ($La_{1-x}Sr_xMn_yO_{3-\delta}$ or LSM), the cermet: NiO-yttriated zirconia YSZ, nickelates ($La_4Ni_3O_{10}$, $La/Nd_2NiO_4$), chromo-manganites (LaCeSrCrMnO), ferrites ($La_{1-x}Sr_xFe_yO_{3-\delta}$), cobaltites ($La_{1-x}Sr_{x}Co_yO_{3-\delta}$) and titanates ($La_4Sr_{n-4}Ti_nO_{3n+2-\delta}$).

Advantageously, the step f) or brazing step may be carried out in air.

Advantageously, the anode, the cathode and the electrolyte have identical planar surfaces and which preferably coincide, and therefore there is no loss of active surface area.

Although certain patent applications already mentioned above, i.e. WO-A1-2006/086037; WO-A2-2006/127045; WO-A2-2007/062117 mention the possibility of brazing porous electrodes, no demonstration of the feasibility of such a method without degrading the electrodes is made at the scale of the grain.

The method according to the invention includes a specific series, succession of steps which has never been described or suggested in the prior art.

In the literature, the use of a metal, of a metal alloy or of a liquid brazing (composition, material) for infiltrating a porous material and forming a metal/metal or metal/ceramic composite material with particular properties especially as regards electrical, mechanical, thermal characteristics or the weight etc., is certainly commonly described. This operation is sometimes followed by an operation for brazing the thereby formed material with a second material. This is therefore a method which has the drawback of including two steps.

The infiltration of a metal or a liquid metal alloy in a porous material or a foam may also have the purpose of clogging the porosity of the porous material so as to densify it and/or make it tight, as this is described in patent U.S. Pat. No. B1-6,355,356, but, in this patent, the liquid alloy is not used for brazing a third component.

The infiltration may also have the double, dual, purpose of filling the porosity of a porous material or of a metal foam or ceramic and of assembling it mechanically, in a single operation, with a third material as this is disclosed in patent application WO-A2-91/13462 and in patent U.S. Pat. No. B2-6,490,146. In these documents, no sealing, tightness function is either mentioned or sought and no method aiming at controlling the infiltration of the liquid metal and preventing it in certain areas is indicated.

The method according to the invention inter alia meets the whole of the needs listed above, does not have the drawbacks of the methods of the prior art and provides a solution to the problems of the methods of the prior art.

According to the invention, the infiltration of the brazing in all the directions is perfectly controlled, is perfectly mastered, by applying openworked electrodes provided with holes, openworks, cut-outs which delimit the electrode areas on which the brazing composition is applied and then melted, on the one hand, and by using a specific brazing composition amount, determined such that in the molten state, it fills all the porosity in the thickness of the anode or of the cathode as far as the surface of the electrolyte in said second areas, without jutting out beyond the <<free>> surface of the anode or of the cathode in the second areas by a <<height>> equal to more than 20% of the thickness of the anode or of the cathode, and preferably without jutting out at all beyond the <<free>> surface of the anode or of the cathode.

By using, according to the invention, openworked electrodes having holes, openworks, cut-outs, apertures, lateral infiltration of the brazing composition, brazing alloy, is mastered and controlled since these holes give the possibility of stopping the lateral progression of the liquid brazing composition.

According to the invention, the brazing alloy fills the porosity of the electrodes along their thickness which is generally from 10 to 70 µm and reaches the electrolyte without laterally infiltrating in the electrodes over distances generally greater than a 1,000 μm, and further the upper or lower portion of the gaskets remains in the plane of the electrodes which is also the one of the interconnection plates. This is made possible according to the invention by using a determined amount of brazing composition which is generally less than or equal to the volume of the pores to be filled in the volume defined by the surface of said second areas of the electrolyte, the corresponding surface of the electrodes and the thickness of the electrode.

According to the invention, the amount of brazing composition is therefore calculated so that the liquid brazing composition reaches the interface between the anode or the cathode and the electrolyte by taking the porosity of the anode or of the cathode into account and also so that there only remains an amount of brazing at the surface, the thickness of which corresponds to a thickness of less than or equal to 20% of the thickness of the electrodes (anode or cathode). Preferably, it is desirable that there no longer remains any brazing (composition, material) at the surface of the cathode or of the anode, i.e. that the brazing composition does not jut out beyond the surface of the cathode or of the anode.

The amount of brazing (composition, material) to be added is calculated from the specific gravity of the brazing and from the volume to be infiltrated, defined by the minimal width and thicknesses of the second area(s) and the minimal porosity of the electrodes.

According to the invention, the gaskets therefore only have a limited overthickness, or even no overthickness, it is not necessary to resort to long and complex operations for compensating this overthickness and a stack which specifically observes the chain of dimensions (tolerance stack-up) is easily obtained in a limited number of steps.

The method according to the invention gives the possibility of obtaining a gas-tight stack meeting the leak flow rate criteria, and mechanically solid.

Especially, the method according the invention gives the possibility of assembling a cell with a constant thickness, to within the flatness defects, with the interconnectors, of obtaining gas-tight cell/interconnector gaskets for example at pressure differences of 200 mbars from 20° C. to 900° C. The measured leak flow rate is for example in air of less than $10^{-3}$ NmL/min/mm at 900° C.

As a summary:
The method according to the invention gives the possibility of ensuring control of the chain of dimensions (tolerance stack-up) of a high temperature water electrolysis stack or of a high temperature fuel cell, via gas-tight gaskets obtained by means of a brazing (composition, material) infiltrated into the electrodes of the cell,
The assembling method is achieved in a single step and advantageously in air,
The assembling and the tightness are accomplished in a single operation without adding any overthickness to the parts to be stacked, which allows control of the total thickness of the stack,
The design of the electrodes gives the possibility of controlling the infiltration distance of the brazing composition or brazing alloy,
The method according to the invention is simple, reliable and of low cost. In particular, the deposition of the electrodes and of the brazing (composition, material) by screen-printing is an inexpensive method, currently used in the industry.

Other effects and advantages of the invention will become better apparent upon reading the detailed description which follows, made with reference to the appended drawings wherein:

Figure 12:
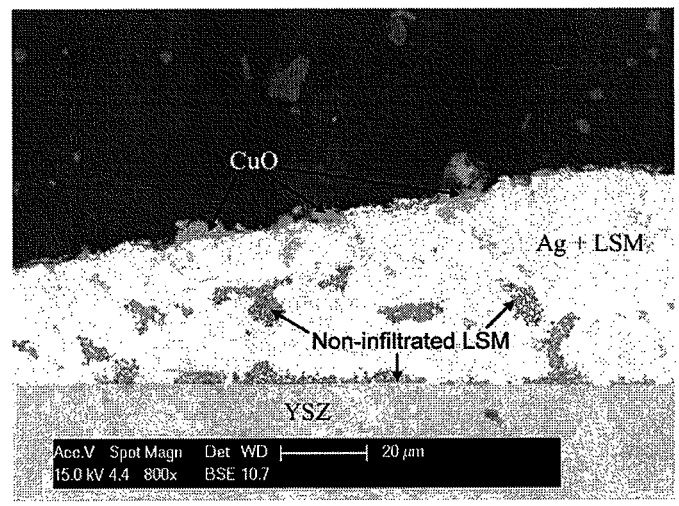
FIG. 12 is a photograph taken with a scanning electron microscope (SEM) of a section of the LSM pattern with a width of 1 mm, infiltrated by Ag—Cu, shown in FIG. 11.

The scale indicated in FIG. 12 represents 20 μm.

Figure 11:
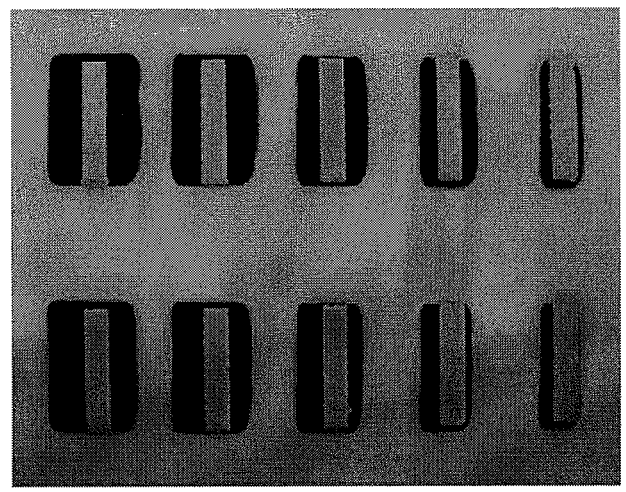
FIG. 11 is a photograph illustrating Example 2 which shows grey Ag—Cu brazing strips, with a width of 1 mm and a length of 5 mm superposed on black LSM patterns with a thickness of 50 μm, a length of 5 mm and with different widths (1 mm, 1.5 mm, 2 mm, 2.5 mm and 2.9 mm)
Figure 13:
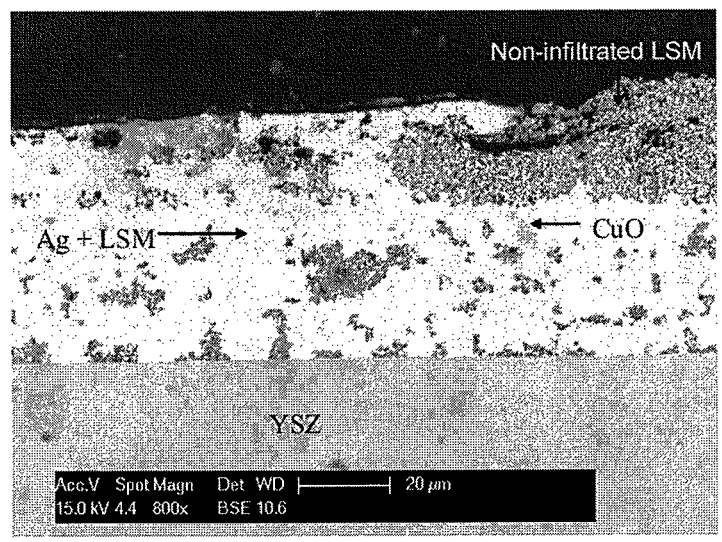

FIG. 13 is a photograph taken with a scanning electrode microscope (SEM) of a section of the LSM pattern with a width of 1.5 mm infiltrated by Ag—Cu, shown in FIG. 11.

The scale indicated in FIG. 13 represents 20 μm.

Figure 14:
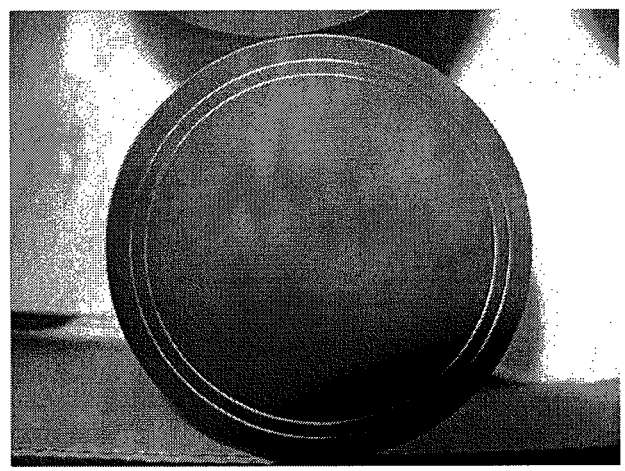
Figure 15:
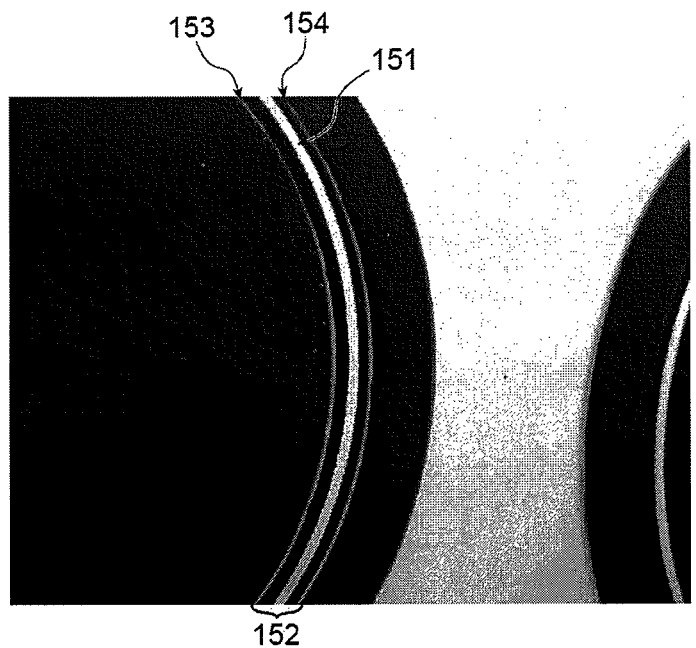
Figure 16:
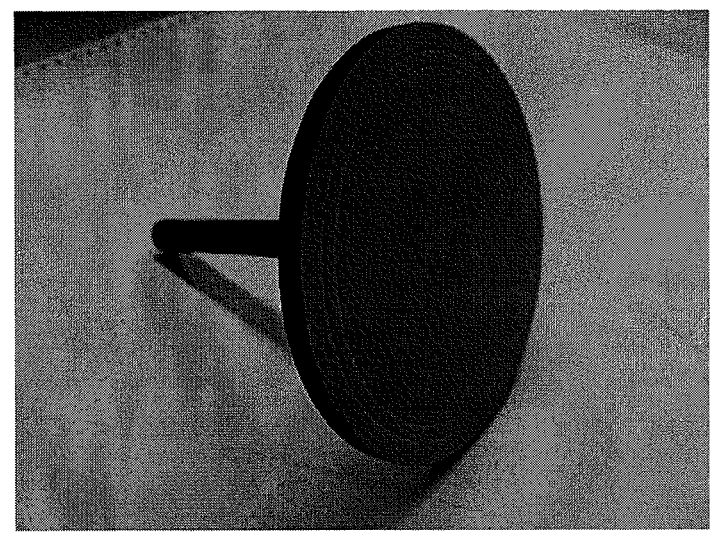

FIG. 14 is a photograph which shows the LSM electrode provided with 2 annular holes, openworks, cut-outs prepared in Example 3;

FIG. 15 is a photograph showing the Ag-3Cu brazing paste bead deposited at the centre of the area located between the two holes, openworks, cut-outs of the LSM electrode prepared in Example 3 and shown in FIG. 14;

FIG. 16 is a photograph of a model, a part prepared by brazing the cell shown in FIG. 15 (Example 3), of a stamped part made of Crofer 22APU and of a part with a thickness of 2.5 mm made of Crofer 22APU.

Figure 17:
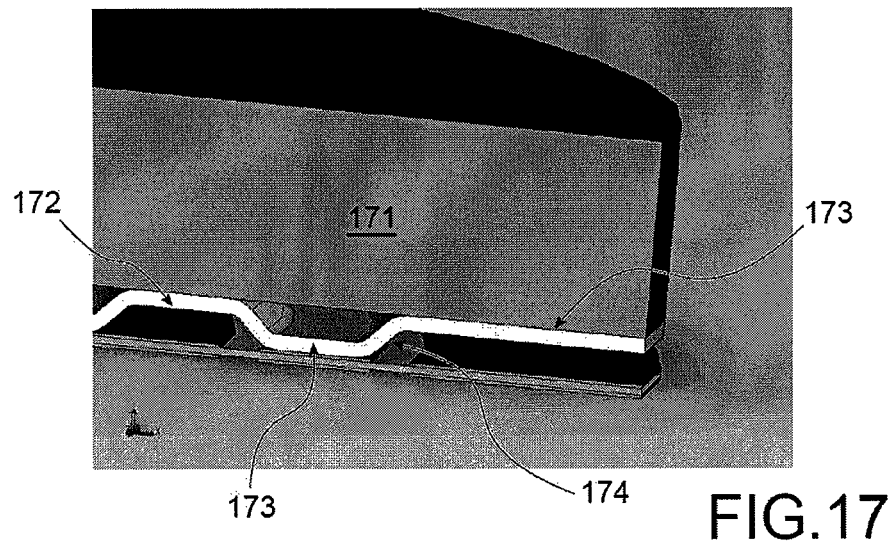

FIG. 17 is a sectional CAD view of the model, part shown in FIG. 16.

Figure 18:
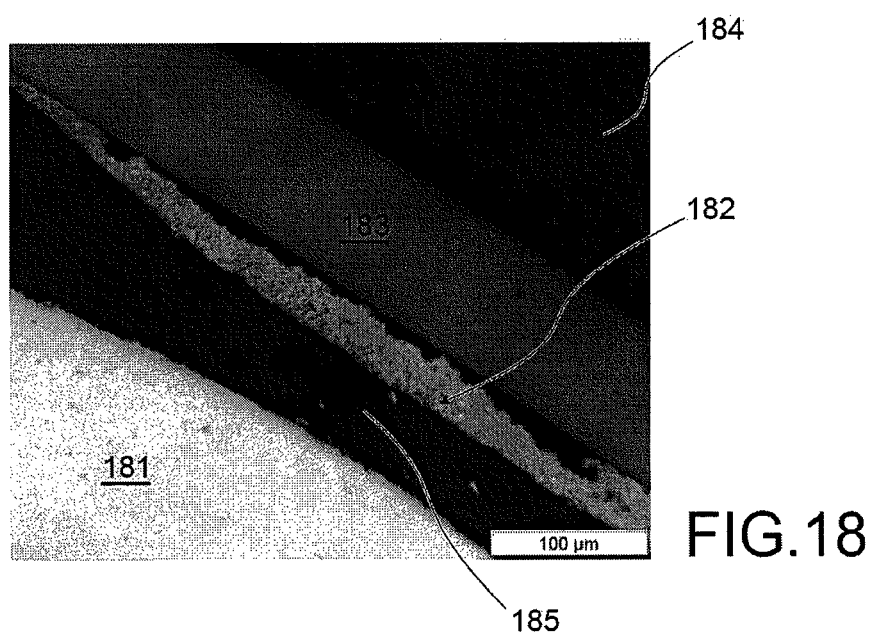

FIG. 18 is a photograph taken with an optical microscope of a part obtained by cutting out the part shown in FIGS. 16 and 17.

The scale indicated in FIG. 18 represents 100 µm.

DETAILED DESCRIPTION OF PARTICULAR EMBODIMENTS

In a first step of the method according to the invention, anode/electrolyte/cathode planar cells of the electrolyzer are prepared, which consists in two electrodes, i.e. an anode and a cathode between which a planar solid electrolyte comprising two faces, i.e. an upper face and a lower face, is positioned.

In other words, the anode on the one hand and the cathode on the other hand "sandwich" the solid electrolyte and are each directly in contact with one of the faces of the electrolyte.

The manufacturing of the anode/electrolyte/cathode planar cells is carried out by a method known to the man skilled in the art.

First of all, the electrolyte is manufactured, which generally appears as a plate, a thin planar layer with a thickness generally from 50 µm to 200 µm, preferably from 80 to 90 µm.

The electrolyte is generally made of a material selected from ceramics, preferably from doped oxide ceramics, such as yttriated zirconia for example with 3% by moles of Y also designated as 3YSZ, scandiated zirconia also called ScSZ and strontiated lanthanum manganite doped with cerium.

Figure 1:
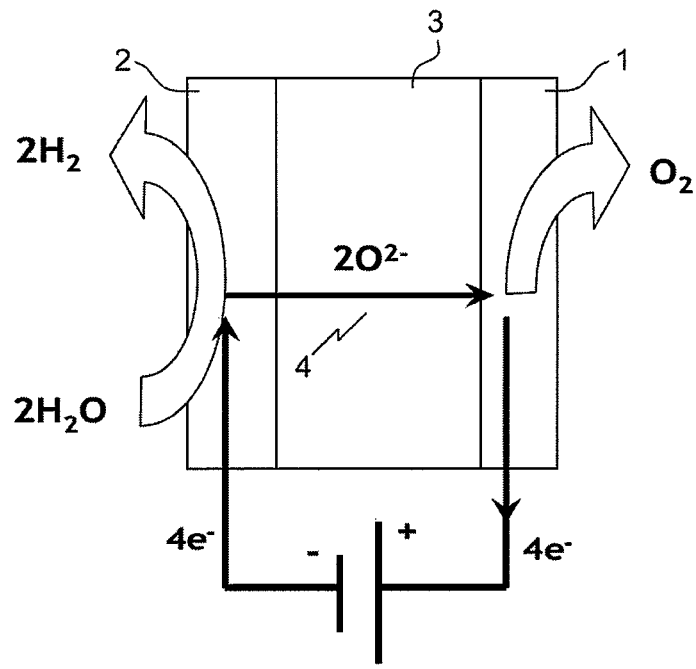
FIG. 1 is a schematic vertical sectional view of an elementary cell of a high temperature electrolyzer (HTE)
Figure 2:
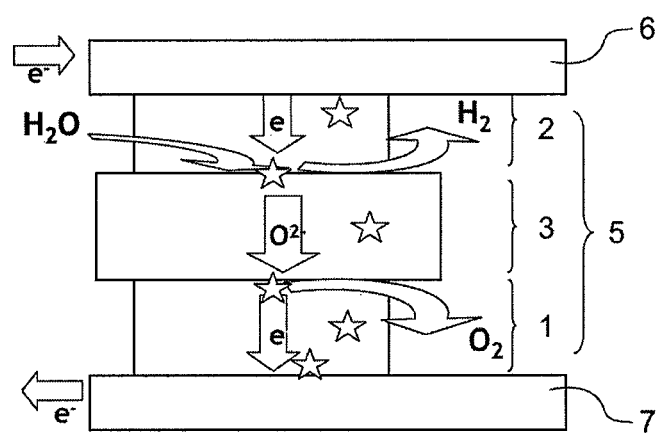
FIG. 2 is a schematic vertical sectional view of an elementary reactor or elementary module of a high temperature electrolyzer ("HTE")
Figure 3:
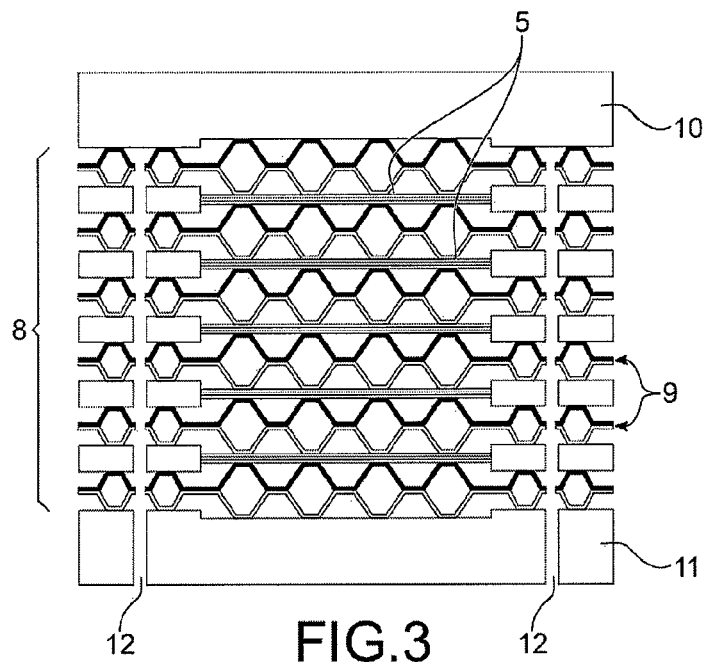
FIG. 3 is a schematic vertical sectional view of a conventional high temperature electrolyzer comprising a stack of elementary modules.
Figure 4:
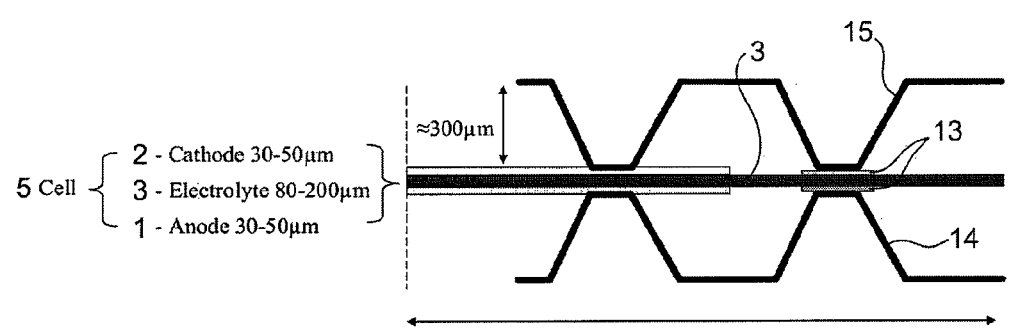
FIG. 4 is a schematic vertical sectional view of an elementary module of a conventional high temperature electrolyzer which shows the seal gaskets between the cell and the lower and upper interconnectors.
Figure 5:
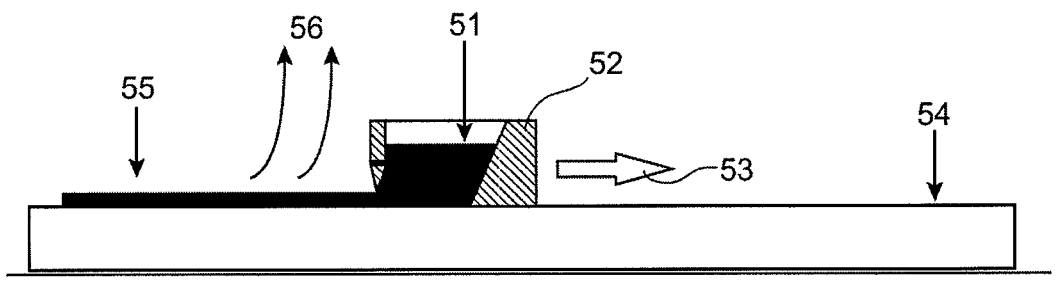
FIG. 5 is a schematic vertical sectional view of a non-continuous strip casting device.

The electrolyte may for example be prepared by non-continuous strip casting by means of a casting bench, as this is illustrated in FIG. 5.

Strip casting is a technique well known to the man skilled in the art for depositing thin layers from a suspension (slurry) of a powder especially of ceramic(s). More specifically, a suspension (51) of a powder of the ceramic in an adequate solvent such as ethanol is contained in a tank of a mobile shoe (52), which is translationally moved (53) on a planar fixed support (54), a cast strip (55) is thereby formed, which dries by evaporation (56) of the solvent in order to give a crude (green) strip generally with the thickness specified above from 50 µm to 200 µm, preferably from 80 to 90 µm.

The crude (green) part obtained after strip casting is then cut out to the desired shapes and dimensions for example by means of a punch or of a carbon dioxide laser.

The crude (green) part may have the shape of a polygon, for example a shape of a rectangle or a square, or else further the shape of a disc. It may include opening holes for circulating the gases.

The surface area of the part making up the electrolyte or rather the surface area of the main plane of the latter is generally from 100 $cm^2$ to 500 $cm^2$, preferably from 225 to 400 $cm^2$.

The electrolyte is then sintered. This sintering may take place in an oven for example in air. The sintering temperature may generally be from 1,400° C. to 1,600° C., for example about 1,500° C. for "3YSZ", for example.

This sintering operation allows removal of the organic components by evaporation, and agglomeration of the grains together in order to form a dense material, i.e. having a porosity of generally less than 10%.

It is then proceeded with the manufacturing of the electrodes on each of the faces of the electrolyte.

The manufacturing of a first electrode is begun on one of the faces of the electrolyte.

For example, it is possible to begin by manufacturing the cathode on the upper face of the electrolyte.

A second electrode is then manufactured on the other face of the electrolyte. For example, it is thus possible to manufacture the anode on the lower face of the electrolyte.

In order to manufacture the electrodes according to the invention, it is possible to proceed first of all with multi-layered deposition of a suspension (slurry) of the material making up the electrode on one face of the electrolyte and then with carrying out sintering of the deposit generally in air.

By multilayer, is meant a succession of identical or different materials optionally having a composition and/or porosity gradient. The man skilled in the art is aware of how to prepare such multilayers.

The preferred materials for the "HTE" cathode (anode in the SOFC mode) and the HTE anode (cathode in the SOFC mode) are, respectively, the cermet nickel oxide-gadoliniated cerium oxide (NiO—CGO) and strontiated lanthanum manganite ($La_{1-x}Sr_xMn_yO_{3-\delta}$ or LSM).

These are the most currently used materials today industrially in the SOFC mode, but many other materials and combinations may be contemplated, such as the cermet NiO—YSZ, nickelates ($La_4Ni_3O_{10}$, $La/Nd_2NiO_4$), chromomanganites (LaCeSrCrMnO), ferrites ($La_{1-x}Sr_xFe_yO_{3-\delta}$); cobaltites ($La_{1-x}Sr_xCo_yO_{3-\delta}$) or titanates ($La_4Sr_{n-4}Ti_nO_{3n+2-\delta}$).

The deposition of these suspensions may be achieved by an adequate technique. The thickness of the deposit is such that it allows electrodes to be obtained with a thickness from 10 to 70 µm, for example 40 µm.

However, according to the invention the deposition of the electrode layers is generally achieved by screen-printing by means of a screen printer or a screen-printing apparatus.

Figure 6:
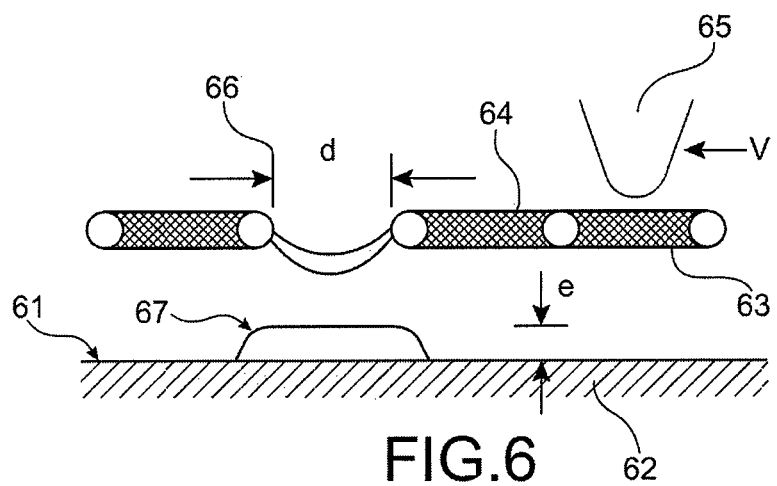
FIG. 6 is a schematic vertical sectional view illustrating the principle of deposition by screen-printing.

The principle of screen-printing is shown in FIG. 6. It consists of depositing on a face (61) of the electrolyte (62), by means of a metal mask (63) provided with meshes (64), for example with a size of about 40 µm, and a doctor blade (65) moving at a velocity V, a suspension (slurry) or ink which generally comprises one or more inorganic powder(s)—this or these powder(s) being composed of the material(s) making up the electrode—and an organic portion composed of one or more organic compound(s) such as binders, dispersants, and plasticizers.

Advantageously, the mask is provided with apertures (66), for example with a width d which allows a selective deposition to be achieved on defined areas of the electrolyte (second areas) by leaving non-covered areas. A preferably selective screen-printed deposit is thereby obtained (67) with a thickness on the surface of one of the faces of the electrolyte.

Thus, in the case of the cathode, it will be possible to elaborate and deposit an ink based on NiO and on CGO and in the case of the anode, it will be possible to elaborate and then deposit an ink based on LSM.

Sintering is carried out at a temperature which may easily be determined by the man skilled in the art.

As an example, the deposition of a suspension of a first electrode material, for example of the cathode material, on one of the faces of the electrolyte followed by sintering of the deposit of the suspension of the first material at a temperature for example of 1200° C. in an air oven, may be carried out in order to thereby obtain an electrolyte-cathode half cell.

A suspension of a second electrode material for example of the anode material may then be deposited on the other face of the electrolyte and then the deposit of the suspension of the second material may be sintered, at a temperature for example of a 1050° C. in an air oven, in order to thereby obtain a complete cell.

With the thermal sintering treatments, it is possible to remove the organic portion and to bind the electrolytes and the electrodes.

According the invention, the manufactured electrodes have to be openworked electrodes, i.e. electrodes having cut-out holes, openworks or apertures, which pass right through them in the direction of the thickness. These holes, openworks define, on each of the faces of the electrolyte, surface areas non-covered by the anode or the cathode, these first non-covered areas delimiting second covered surface area(s) covered by the anode of the cathode, so called <<full>> areas, at the locations of the brazed gaskets to be made.

These holes, openworks may have any shape but it is important that they exactly delimit said second area(s) so that the liquid brazing composition is well confined in the second areas and cannot escape laterally, i.e. in the plane of the electrode.

In a first embodiment for making these holes, openworks, the suspensions (slurries) or inks described above may be selectively deposited so that the deposition is not carried out on these first areas of the electrolyte.

For example, the use of specific screen-printing masks may give the possibility of not depositing the screen-printing ink in first areas on either side of the second area which will be in contact with the brazing alloy.

In the case of a disc-shaped supporting electrolyte cell for example with a diameter of 120 mm, the electrodes are typically, in the prior art, discs for example with a diameter of 110 mm and a thickness of 40 µm. The cells may also be square or rectangular.

Figure 7:
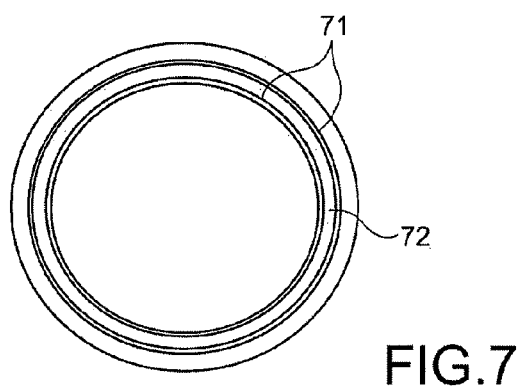
FIG. 7 is a top view of a cell of a high temperature electrolyzer comprising an openworked electrode deposited on an electrolyte in the form of a disc.

With suitable screen-printing masks, it is possible to deposit, as this is shown in FIG. 7, electrodes with a diameter identical with that of the electrolyte, for example 120 mm, and not to deposit any material on two rings (71) of width A for example from 10 to 500 µm, on either side of an electrode ring (72) of width B for example from 50 µm to 1 mm.

Following selective deposition, it is of course proceeded with sintering under the conditions already described above.

In a second embodiment for making holes, openworks, cut-outs, complete non-openworked electrodes may be made on the electrolyte, i.e. the electrodes cover the whole underlying surface of the electrolyte, the surface area of the electrodes being generally identical with that of the electrolyte and generally coinciding with the latter. These complete electrodes may be made for example by depositing a suspension or ink for example by screen-printing followed by sintering.

Removal of material is then achieved for generating holes, openworks, first areas in the complete electrodes. Material removal may be accomplished for example by laser ablation or machining.

In the case of laser ablation, the carbon dioxide laser is programmed for scanning the surface which is desirably to be removed, which corresponds to the holes of the electrode. The material is removed by photoablation, which consists, by means of the thermal power delivered by the laser, of evaporating the material in the selected areas.

In the openworked electrode cell applied according to invention, the surface area of the electrodes in their main plane is generally advantageously identical with that of the electrolyte and generally coincides with the latter. In other words, the electrodes and the electrolyte coincide, are perfectly superposed and globally have the same surface area (leaving aside the gaskets), this is an advantage with respect to the prior art in which the dimensions of the electrodes and especially of the cathode may be reduced in order to be able to braze the interconnector on the electrolyte, and the active surface is thereby reduced.

According to the invention, a cell with openworked electrodes having being made as described above, a brazing composition layer is then deposited on the surfaces of the anode and of the cathode, which cover the second areas of each of the faces of the electrolyte delimited by the first non-covered areas, the amount of brazing composition being such that, in the molten state, it fills all the porosity in the thickness of the anode or of the cathode as far as the surface of the electrolyte in the second surface area(s), without jutting out beyond the surface of the anode or of the cathode by a thickness of more than 20% of the thickness of the anode or of the cathode; whereby an elementary cell is obtained, provided with a brazing composition, on the second determined areas of the surface of the electrodes corresponding to the locations of the brazed gaskets ensuring the assembling between the electrodes and the interconnection plates and the seal.

Preferably, the amount of brazing composition is such that it does not jut out at all beyond the surface of the anode or of the cathode while arriving as far as this surface, in other words by being flush with this surface of the anode or of the cathode.

Deposition of the brazing composition may be accomplished by any adequate technique, screen-printing however being a preferred technique.

Thus, if reference is made to FIG. 7, it will be possible to deposit for example by screen-printing, a brazing bead of width C for example from 50 µm to 1 mm above the electrode ring (72) of width B.

For this, a screen-printing mask is used which, positioned above the cell prepared beforehand, allows deposition of a brazing layer of width C on the electrode ring (72) of width B.

The linear amount of deposited brazing by screen-printing is of the order of 0.05 mg/mm.

The brazing composition generally comprises a powder of the elements intended to form the brazing conventionally suspended in a liquid organic cement, binder, preferably both viscous and tacky, in order to obtain a paste, suspension (slurry), or ink, allowing homogeneous spreading over the surfaces of the gasket to be brazed. The binder may thereby be selected in order to ensure a viscosity of the brazing composition of about 500 Pa·s at a speed of 1 rpm and at 25° C. (Brookfield RVT/ABZ "Spindle" viscosimeter)

The binder, cement, generally decomposes for example between 100 and 300° C. without leaving any traces. This may for example be a binder based on polyvinyl butyral and on acetates.

The preferred brazing (composition, material) contains silver and copper powders for example in a mass ratio 97/3 mixed with organic binders for example at about 20% by mass.

The deposited brazing thickness is for example (see FIG. 8A) about 50 µm for a typical width of 0.5 mm.

This brazing (material, composition) has good wettability on the electrodes, with contact angles of 15° and 33° on LSM and NiO—CGO respectively in air at 1050° C. Other brazing compositions adapted to brazing in air may be contemplated in the Ag—Cu, Ag—CuO, Ag—Cu—Ti, Ag—CuO—TiO$_2$, Ag—Cu—Al or Ag—CuO—Al$_2$O$_3$ systems; this alloy list is not exhaustive. They all have the advantage of adhering on many oxide ceramics, including YSZ, and on the oxidized surface of many metals, including those used for the interconnectors.

The brazing may be deposited with other techniques such as a robot or a manual deposition with a syringe.

The robot used may for example be a 3-axis robot of the SCARA® JSR4400N type coupled with a pneumatic dispenser EFD Ultra® 2400 and provided with a syringe in which the brazing paste to be deposited is placed. The ejection pressure, the temperature and the syringe-electrode distance are the parameters to be adjusted in order to vary the quality of the deposit.

The minimum linear amount of brazing deposited by the robot for obtaining an even deposit is at least 0.2 mg/mm.

Manual deposition, by means of a syringe and a pneumatic dispenser, is much less even than the deposits made with the robot.

The preferred deposition method is therefore screen-printing, which allows deposition of the smallest amounts of brazing.

n cells provided with a brazing composition are prepared in the same way as described above, if it is desired to made a stack of n cells, n is an integer from 100 to 1,000, for example 500.

The continuation of the method and especially the brazing operation generally take place in the following way:
- the lower terminal plate of the "stack" of the high temperature electrolyzer is set into place, for example in an air oven on a support;
- an interconnection plate and a cell provided with its deposited brazing layer(s) are "stacked" vertically, in alternation,
- the previous operation is repeated n times if the stack consists of n cells, and then a last interconnection plate (n+1) is positioned on the n$^{th}$ cell;
- the upper terminal plate of the stack is set into place on the "stack";
- toolings placed outside the stack give the possibility of ensuring proper alignment of the different layers of the stack; a weight placed on the stack may be added in order to facilitate the contacting of the parts during the brazing;
- the actual brazing is then carried out.

For this, it is for example possible to increase the temperature of the oven from room temperature, for example 20° C., up to the brazing temperature comprised for example between 950° C. and 1,050° C.

This rise in temperature may be accomplished, for example at a rate of 0.5° C./min. This temperature rise ramp may further optionally include a debinding plateau (for removing the organic binder) for the brazing for example at a temperature from 300 to 500° C. for a duration of one hour and/or another plateau for thermal homogenization of the stack for example at a temperature from 800 to 900° C., for a duration for example from 10 minutes to 2 hours. The stack is provided with several thermocouples with which the temperature may be monitored in different points.

A plateau is then observed at the brazing temperature, for example from 940 to 1,100° C. for a duration from 1 minute to 2 hours, for example 1 hour.

The stack is cooled from the brazing temperature down to room temperature, for example 20° C., at a rate of for example 0.5° C./min.

The preferred material for the terminal plates and the interconnectors is Crofer22APU® produced by ThyssenKrupp®, but many other ferritic steels may be used such as F18TNb from ArcelorMittal®.

A superalloy based on nickel may also be used such as Haynes 230®.

The terminal plates and the interconnectors may optionally be coated with a protective oxide deposit, obtained by chemical or physical vapor deposition, by screen-printing or plasma projection, for example.

Applying a slight pressure to the stack may be carried out in order to ensure the junction between the plate and electrodes.

Figures 8A, 8B:
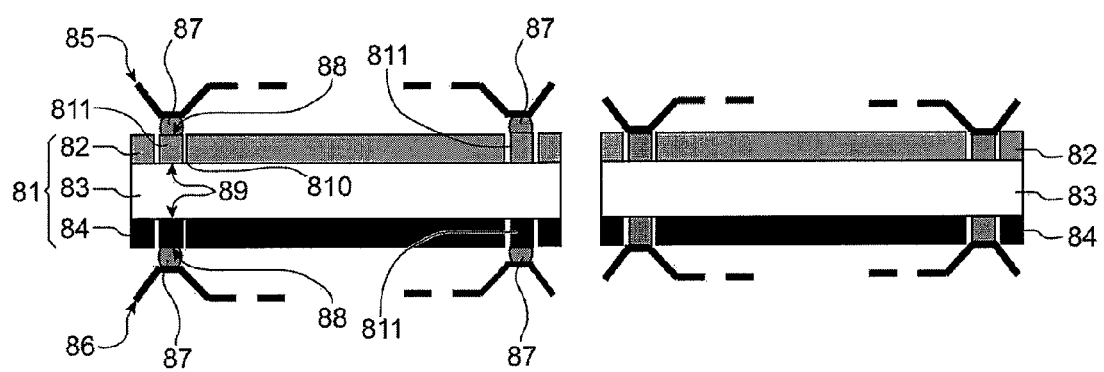
FIG. 8A is a schematic vertical sectional view before brazing according to the invention of an elementary module of an "HTE" stack which shows the brazing beads deposited on the electrodes.
FIG. 8B is a schematic vertical sectional view of the module of FIG. 8A after brazing according to the invention which shows the infiltration of the brazing into the porosity of the electrodes.

As this is shown in FIGS. 8A and 8B, during the brazing cycle between the cell (81) formed by a cathode (82), an electrolyte (83) and an anode (84), and the interconnectors (85, 86), the brazing composition (87) or brazing alloy is initially deposited on the upper or lower surfaces (88) of the electrodes corresponding to the second surface areas (89) of the electrolyte, these second areas being delimited by first non-covered surface areas (810) and corresponding to holes (811) in the electrodes.

The brazing composition under the effect of the heating then passes into the liquid state (FIG. 8B), and infiltrates by capillarity into the second area(s) (89) for example in the electrode ring (72) as illustrated in FIGS. 7, 8A and 8B, fills up its porosity while reducing its initial thickness compatible with control of the chain of dimensions (tolerance stack-up), and allows in a same operation the assembling of the electrolyte and of the interconnectors.

The brazing stops by a capillary effect at the edges of the second area for example of the ring (72, 89) along the directions X and Y; the capillary infiltration is controlled by the radius of the pores; when this radius becomes infinite, the infiltration length becomes zero. In the direction Z, the brazing amount is calculated so that it reaches the electrolyte e.g. zirconia/electrode interface (surface 89) by taking into account the porosity of the latter (FIG. 8B), but also so that the brazing at the surface of the electrode is of a thickness less than or equal to 20% of the thickness of the electrode, advantageously so that there no longer remains any brazing at the surface (88) of the electrode, and thus the chain of dimensions (tolerance stack-up) of the stack is observed.

Figure 9:
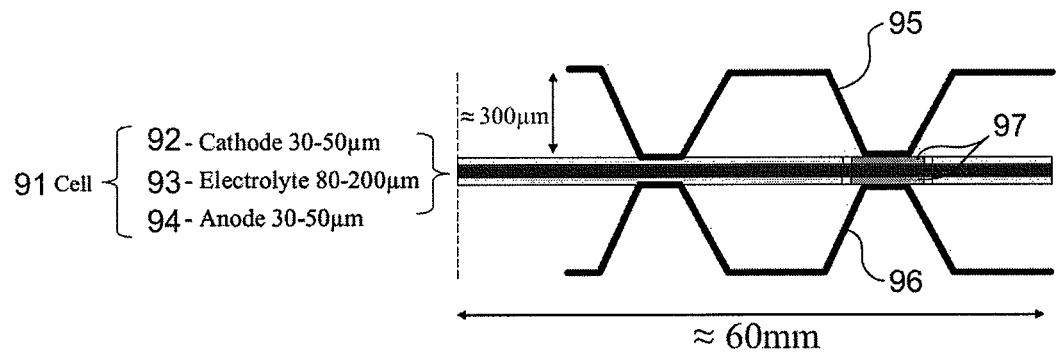
FIG. 9 is a schematic vertical sectional view of an elementary module of a stack of a high temperature electrolyzer or of a SOFC made by the method according to the invention.

An elementary module of a high temperature electrolyzer (or of an SOFC) manufactured by the method according to invention is illustrated in FIG. 9. This elementary module comprises a cell (91) with a cathode (92) for example with a thickness of 30 µm, an electrolyte (93) for example with a thickness from 80 to 200 µm, and an anode (94) for example with a thickness of 30 µm. This module further comprises lower (95) and upper (96) (half) interconnectors respectively belonging to upper and lower interconnection plates of the stack. The interconnectors (95, 96) are by means of the method according to the invention directly assembled on the anode (94) and the cathode (92) by tight brazed joints (97) made in the porosity of these electrodes without any overthickness being able to be distinguished and without any lateral infiltration of the brazing into the electrodes being visible. Indeed, by means of the method according to invention, the lateral infiltration of the brazing was perfectly controlled as well as the filling of the porosity in the thickness of the electrodes.

It should be noted that the thicknesses and dimensions mentioned in FIG. 9 are only given as examples and are by no means limiting.

Figure 10:
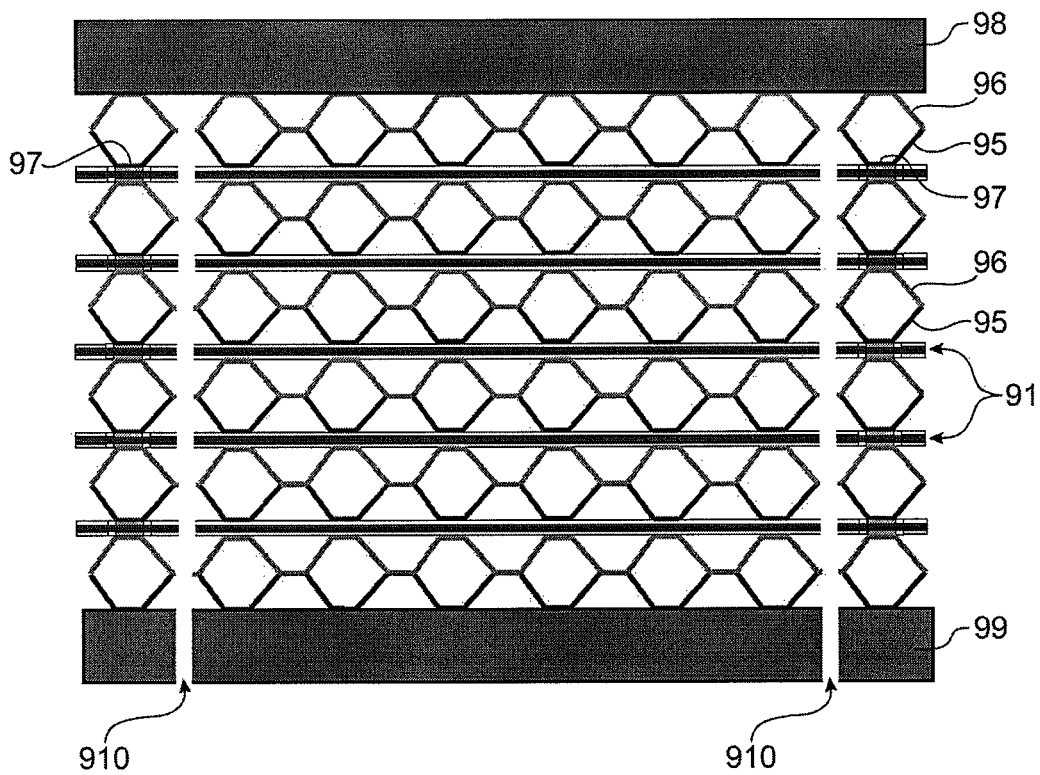
FIG. 10 is a schematic vertical sectional view of a stack of a high temperature electrolyzer or of a "SOFC" made by the method according to the invention.

A stack of a high temperature electrolyzer (or an SOFC) manufactured by the method according to invention is illustrated in FIG. 10, it consists of a stack of modules such as the one of FIG. 9, between a terminal upper plate (98) and a terminal lower plate (99).

By means of the method according to invention, it may be definitively assembled in a single brazing step and it has accurately controlled dimensions because of the control of the infiltration of the brazing in the electrodes thereby defining perfectly dimensioned and delimited gaskets.

This stack is also provided with passages (910) for supplying and discharging gases.

The method according to invention may not only be applied to high temperature electrolyzers ("HTE") and to solid oxide fuel cells (SOFC) but also to any other electrochemical system operating at a high temperature and including a stack of units, elementary cells such as for example oxygen generators or gas separation membranes.

The invention will now be described with reference to the following examples, given as an illustration and not as a limitation.

EXAMPLES

Example 1

A "tightness" specimen consisting of a cell with a diameter of 56 mm and of an interconnector in <<Crofer22APU>> was brazed through its LSM electrode.

At 800° C., under a pressure difference of 200 mbars, the measured leak flow rate was less than $5.6 \times 10^{-4}$ NmL/min/mm.

As a comparison, with identical specimens for which the brazed gasket is made between the electrolyte and the interconnector, the measured leak flow rate is less than $2 \times 10^{-4}$ NmL/min/mm.

Example 2

LSM patterns with a thickness of 50 µm, a length of 5 mm and of different widths (1 mm, 1.5 mm, 2 mm, 2.5 mm and 2.9 mm) were made by screen-printing on an yttriated zirconia support.

After sintering of the LSM patterns, silver-copper brazing strips with a width of 1 mm and a length of 5 mm were superposed on these patterns by screen-printing.

On the photograph of FIG. 11, the grey Ag—Cu brazing strips may be observed on the black LSM patterns.

Each strip has a mass of 0.79 mg, which represents a linear amount of brazing of 0.16 mg/mm.

The infiltration of the Ag—Cu brazing in the porosity of the LSM patterns was carried out by heat treatment in air at 970° C. for 2 minutes. The zirconia sample was then cut to half length of the patterns, coated in a resin and polished with up to a grain of 1 µm so as to observe the distribution of the brazing in the LSM and to quantify the infiltrated porosity percentage. The five LSM patterns infiltrated with Ag—Cu were observed under an optical microscope. None of them had any metal residue at the surface, except for a few islets of CuO with a thickness of 3-4 µm. The filling levels of their porosity were approximately estimated by image analysis and are given in Table 1, below:

TABLE 1

| Filling level of the 5 LSM patterns. | | | | |
|---|---|---|---|---|
| LSM Pattern 1 mm | LSM Pattern 1.5 mm | LSM Pattern 2 mm | LSM Pattern 2.5 mm | LSM Pattern 2.9 mm |
| 85% | 70% | 60% | 50% | 40% |

For all these patterns, it was confirmed that the brazing reached the porous LSM/dense YSZ interface by capillary infiltration and was actually stopped at the edges of the patterns.

The LSM patterns of width 1 mm and 1.5 mm were also observed in a section by scanning electron microscopy.

The section of the LSM pattern of width 1 mm is shown in FIG. 12 and that of the LSM pattern of width 1.5 mm in FIG. 13.

Example 3

An LSM electrode with a thickness of 50 µm was deposited by screen-printing on an yttriated zirconia (YSZ) disc with a diameter of 56 mm, and then sintered.

A NiO—CGO electrode was screen printed symmetrically on the other face of the electrolyte. The LSM electrode was provided with two gaps, annular holes, openworks, cut-outs allowing separation of the active area of the electrode from the area on which the brazed gasket is later made (FIG. 14). The area of the gasket had a width of 1.45 mm and the holes were 0.5 mm holes.

An Ag-3Cu brazing paste bead (151) was then deposited by means of a robot at the centre of the area (152) located between the two holes (153, 154) (FIG. 15). The linear amount of brazing was 0.22 mg/mm.

A model, consisting of this cell, of a stamped part made of Crofer22APU and of a part with a thickness of 2.5 mm made of Crofex22APU, was then brazed in air at 970° C.

FIG. 16 shows this model after brazing.

FIG. 17 is a CAD sectional view of this part, allowing viewing of the brazing area between the stamped part made of Crofer22APU and the openworked LSM electrode.

More specifically, in FIG. 17 are illustrated the <<thick>> part made of Crofer22APU (171), the stamped part made of Crofer 22APU (172), the brazed gasket (173), and the openworked LSM electrode (174).

After brazing, the part was cut into six pieces with the shape of pie chart portions; two of the pieces were coated and polished in order to evaluate the quality of the brazed interfaces and the filling level of the LSM with the brazing.

During the cutting out, the parts are delaminated (185) at the spinelle $(Cr,Mn)_3O_4$ located at the surface of the Crofer 22APU.

Observations of the parts were carried out under an optical microscope (FIG. 18).

In FIG. 18, the stamped part made of Crofer 22APU (181), the LSM infiltrated by Ag-3Cu (182), the YSZ (183), and the NiO—CGO (184), are identified as well as the delamination phenomenon (185).

These optical microscopy observations have shown that:
1) there is no residual brazing at the surface of the LSM;
2) the brazing has infiltrated as far as the YSZ;
3) the brazing has actually been stopped by the holes, openworks.

The invention claimed is:
1. A method of manufacturing a high temperature electrolyzer (HTE) or a high temperature fuel cell, comprising a vertical stack of n elementary planar cells alternating with n+1 interconnection plates, each of the elementary cells comprising a planar porous anode and a planar porous cathode respectively positioned on each of the faces of a planar dense electrolyte, and brazed joints being provided at contact points between the elementary cells and the interconnection plates, the method comprising the following steps:

a) preparing the planar porous anode and the planar porous cathode on each face of the electrolyte, the planar porous anode being an openworked anode with through holes, and the planar porous cathode being an openworked cathode with through holes, so as to leave exposed first surface areas of each of the faces of the electrolyte corresponding to the through holes in the anode and the cathode, the exposed first surface areas delimiting second surface areas of each of the faces of the electrolyte covered by the anode or the cathode at the locations provided for the brazed joints, wherein an elementary cell is obtained comprising the openworked anode and the openworked cathode, each having a thickness;

b) depositing a brazing composition layer on the surfaces of the anode and of the cathode corresponding to the second surface areas, the brazing composition amount corresponding to an amount that, in the molten state, fills the whole porosity in the thickness of the anode or of the cathode to a level corresponding to the surface of the electrolyte in the second surface areas without protruding beyond the surface of the anode or of the cathode by a thickness of more than about 20% of the thickness of the anode or of the cathode, thereby forming an elementary cell provided with a brazing composition;

c) repeating the preparing and depositing n times;

d) successively stacking an interconnection plate and a cell, the interconnection plate and the cell being vertically stacked;

e) repeating the successive stacking n times;

f) stacking an n+1$^{th}$ interconnection plate;

g) heating the stack formed by the elementary cells provided with the brazing composition and by the interconnection plates to a brazing temperature in order to melt the brazing composition, wherein the brazing composition fills the whole porosity in the thickness of the anode or of the cathode from their surface as far as the surface of the electrolyte in the second surface areas, without protruding beyond the surface of the anode and of the cathode by a thickness of more than about 20% of the thickness of the anode or of the cathode;

h) cooling the stack from the brazing temperature to room temperature; and i) forming the electrolytes and the interconnectors with brazed joints.

2. The method according to claim 1, wherein, in step b), the brazing composition amount is such that, in the molten state, the deposited brazing composition does not protrude beyond the surface of the anode or of the cathode; and wherein, in step g), the brazing composition does not protrude beyond the surface of the anode or of the cathode.

3. The method according to claim 1, wherein prior to step d) a lower terminal plate of the stack is set into place on a support, and wherein following step f) a terminal upper plate of the stack is set into place.

4. The method according to claim 1, wherein the openworked anode and the openworked cathode are prepared by selectively depositing a layer of a suspension of an anode material and a cathode material, respectively, only on said second areas of each of the faces of the electrolyte and then by sintering said layers.

5. The method according to claim 4, further comprising:
depositing a layer of suspension of a cathode material on one face of the electrolyte;
sintering the deposited layer of the suspension of the cathode material;
depositing a layer of a suspension of an anode material on the other face of the electrolyte; and
sintering the deposited layer of the suspension of the anode material.

6. The method according to claim 1, wherein the openworked anode and the openworked cathode are prepared by preparing a non-openworked complete anode and cathode and generating holes by removing material from the non-openworked complete anode and cathode.

7. The method according to claim 1, wherein the brazing composition is deposited on the second surface areas by screen-printing by means of a mask, manually, or with a robot by means of a syringe and a pneumatic dispenser.

8. The method according to claim 1, wherein the electrolyte has a thickness from about 5 to 200 μm.

9. The method according to claim 1, wherein the electrolyte is composed of a dense material having a porosity of less than about 10% by volume.

10. The method according to claim 1, wherein the electrolyte is a material selected from doped oxide ceramics.

11. The method according to claim 1, wherein the anode and the cathode have a thickness from 10 to 70 μm.

12. The method according to claim 1, wherein the anode and the cathode are in a porous material having a porosity from 30% to 50% by volume.

13. The method according to claim 1, wherein the anode and the cathode are independently of each other composed of a material selected from the group consisting of cermet nickel-oxide—gadoliniated cerium oxide (NiO—CGO), strontiated lanthanum manganite ($La_{1-x}Sr_xMn_yO_{3-\delta}$ or LSM), the cermet: NiO-yttriated zircona YSZ, nickelates ($La_4Ni_3O_{10}$, $La/Nd_2NiO_4$), chromo-manganites (LaCeSrCrMnO), ferrites ($La_{1-x}Sr_xFe_yO_{3-\delta}$), cobaltites ($La_{1-x}Sr_xCo_yO_{3-\delta}$) and titanates ($La_4Sr_{n-4}Ti_nO_{3n+2-\delta}$).

14. The method according to claim 1, wherein step g) is carried out in air.

15. The method according to claim 1, wherein the anode, the cathode and the electrolyte have identical planar surfaces.

16. The method according to claim 6, wherein the openworked anode and the openworked cathode are prepared by preparing a non-openworked complete anode and cathode by screen-printing followed by sintering, and by generating holes by removing material from the non-openworked complete anode and cathode by laser ablation or machining.

17. The method according to claim 1, wherein the electrolyte has a thickness from about 50 to 150 μm.

18. The method according to claim 1, wherein the electrolyte has a thickness of about 90 μm.

19. The method according to claim 1, wherein the anode and the cathode have a thickness of about 40 μm.

20. The method according to claim 1, wherein the anode, the cathode and the electrolyte have identical planar surfaces which coincide.

21. The method according to claim 4, wherein the layer of the suspension of the anode material and the layer of the suspension of the cathode material are each deposited by screen-printing by use of a mask.

22. The method according to claim 1, wherein the through holes pass through a stack of elementary cells and interconnecting plates.

23. The method according to claim 1 wherein the through holes are annular holes.

24. The method according to claim 10, wherein the doped oxide ceramic is selected from the group consisting of yttriated zirconia, scandiated zirconia and strontiated lanthanum manganite doped with cerium.

* * * * *